United States Patent
Fujishiro et al.

(10) Patent No.: US 7,741,792 B2
(45) Date of Patent: Jun. 22, 2010

(54) MOTOR CONTROL DEVICE

(75) Inventors: Naoki Fujishiro, Kawachi-gun (JP);
Hirofumi Atarashi, Shioya-gun (JP);
Hiroyuki Isegawa, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 353 days.

(21) Appl. No.: 11/889,475

(22) Filed: Aug. 14, 2007

(65) Prior Publication Data

US 2008/0056690 A1 Mar. 6, 2008

(30) Foreign Application Priority Data

Aug. 31, 2006 (JP) .............................. 2006-236603

(51) Int. Cl.
*H02P 1/54* (2006.01)

(52) U.S. Cl. .................... 318/34; 318/105; 388/816; 388/820

(58) Field of Classification Search ................ 318/34, 318/105, 816, 820; 388/816, 820
See application file for complete search history.

(56) References Cited

U.S. PATENT DOCUMENTS

| 4,305,031 | A | 12/1981 | Wharton |
| 5,245,238 | A | 9/1993 | Lynch et al. |
| 5,656,911 | A | 8/1997 | Nakayama et al. |
| 6,049,149 | A * | 4/2000 | Lin et al. ................. 310/68 R |
| 6,563,246 | B1 | 5/2003 | Kajiura et al. |
| 6,774,591 | B2 * | 8/2004 | Arimitsu et al. ............. 318/154 |
| 6,879,125 | B2 * | 4/2005 | Akatsu ...................... 318/495 |
| 7,174,989 | B2 * | 2/2007 | Mori et al. .................. 180/446 |
| 7,342,367 | B2 * | 3/2008 | Suzuki .................. 318/400.04 |
| 2002/0100624 | A1 | 8/2002 | Joong et al. |

FOREIGN PATENT DOCUMENTS

| JP | 55-153300 A | 11/1980 |
| JP | 8-182398 A | 7/1996 |
| JP | 2001-69609 A | 3/2001 |
| JP | 2004-072978 A | 3/2004 |

* cited by examiner

*Primary Examiner*—Walter Benson
*Assistant Examiner*—David S Luo
(74) *Attorney, Agent, or Firm*—Arent Fox LLP

(57) ABSTRACT

A motor control device includes: a motor that has a plurality of rotors which respectively have a magnetic piece, which drives or supplementarily drives a vehicle; a phase changing mechanism that changes relative phases of the plurality of rotors, and sets these to a predetermined induced voltage constant; and a speed control device that controls a phase changing speed of the phase changing mechanism.

7 Claims, 6 Drawing Sheets

MOTOR CONTROL DEVICE

BACKGROUND OF THE INVENTION

Priority is claimed on Japanese Patent Application No. 2006-236603, filed Aug. 31, 2006, the contents of which are incorporated herein by reference.

1. Field of the Invention

The present invention relates to a motor control device.

2. Description of the Related Art

Heretofore a motor equipped with a first permanent magnet piece and a second permanent magnet piece for which the phase positions are mutually changeable by means of, for example, servo pressure, so that the magnetic field flux can be changed, is known (for example refer to Japanese Unexamined Patent Application, First Publication No. S55-153300).

Furthermore, heretofore for example in motors such as for hybrid vehicles, those provided with an adjustment mechanism in which a plurality of rotors, which are provided with magnetic poles with polarities that are serially different in the rotation direction, are arranged on the same rotation axis such that they are adjacent, and the induced voltage constant of a permanent magnet with respect to the stator is adjusted by changing the spacing of these rotors by means of an actuator, is known (for example refer to Japanese Unexamined Patent Application, First Publication No. 2001-69609).

Incidentally, in a motor according to the abovementioned conventional technology, in a case where current control is performed based on a torque command which is set for example corresponding to accelerator opening or the like related to the accelerator operation of the driver, so that a difference between a current command value and a current detection value with respect to the energizing current of the motor becomes zero, when the relative phase of the plurality of rotors is changed, there is the possibility that it becomes difficult to appropriately perform current control. That is to say, in the feedback control of the current, the induced voltage constant is set to a predetermined value. However, since this is an assumption, then when the induced voltage constant changes due to the change in the relative phases of the plurality of rotors, there is the possibility that it becomes difficult to make the current detection value converge on the current command value.

There present invention was made in view of the aforementioned circumstances and has an object of providing a motor control device that is capable of performing appropriate current control with respect to the energizing current of the motor, even in the case where the induced voltage constant of the motor changes.

SUMMARY OF THE INVENTION

In order to solve the aforementioned object, the present invention employs the followings.

That is to say, the motor control device of the present invention includes: a motor that has a plurality of rotors which respectively have a magnetic piece, which drives or supplementarily drives a vehicle; a phase changing mechanism that changes relative phases of the plurality of rotors, and sets these to a predetermined induced voltage constant; and a speed control device that controls a phase changing speed of the phase changing mechanism.

According to this motor control device, the phase changing speed of the phase changing mechanism is controlled by the speed control device. Therefore, even in a case where a fault occurs in the current control for the energizing current of the motor, attributable for example to a phase change by the phase changing mechanism, the occurrence of this fault can be suppressed, and appropriate current control can be performed.

The speed control device may control the phase changing speed in accordance with a deviation between a torque command and an actual torque for the motor.

In this case, the phase changing speed is controlled in accordance with the deviation between the torque command and the actual torque for the motor. Therefore, the phase changing operation by the phase changing mechanism can be controlled in accordance with a quality condition of the current control for the motor excitation current, and appropriate current control can be performed.

The speed control device may control such that the phase changing speed changes in a downward trend following an increase in the deviation.

In this case, the control is such that the phase changing speed is changed in a downward trend following an increase in the deviation between the torque command and the actual torque for the motor. Therefore, even in a case where a fault occurs in the current control for the motor excitation current attributable to a phase change by the phase changing mechanism, the occurrence of this fault can be suppressed, and appropriate current control can be performed.

The speed control device may integrate the torque command and the actual torque in a predetermined time interval, and in a case where a deviation of integral value pairs exceeds a predetermined threshold value, may change the phase changing speed in a downward trend.

In this case, when the deviation of the integral value pairs in the predetermined time interval for the torque instruction and the actual torque exceeds the predetermined threshold value, the phase changing speed changes in a downward trend. Therefore, even in the case where a fault occurs in the current control for the motor excitation current, attributable to the phase change by the phase changing mechanism, the occurrence of this fault can be suppressed, and appropriate current control can be performed.

The motor may drive the vehicle, or may assist traveling of the vehicle which is driven by an internal combustion engine.

In this case, the occurrence of a relatively sudden change in the travelling behavior of the vehicle attributable to a phase change by the phase changing mechanism can be suppressed.

DETAILED DESCRIPTION OF THE INVENTION

Hereunder, one embodiment of a motor control device of the present invention is described with reference to the appended drawings.

Figure 1:
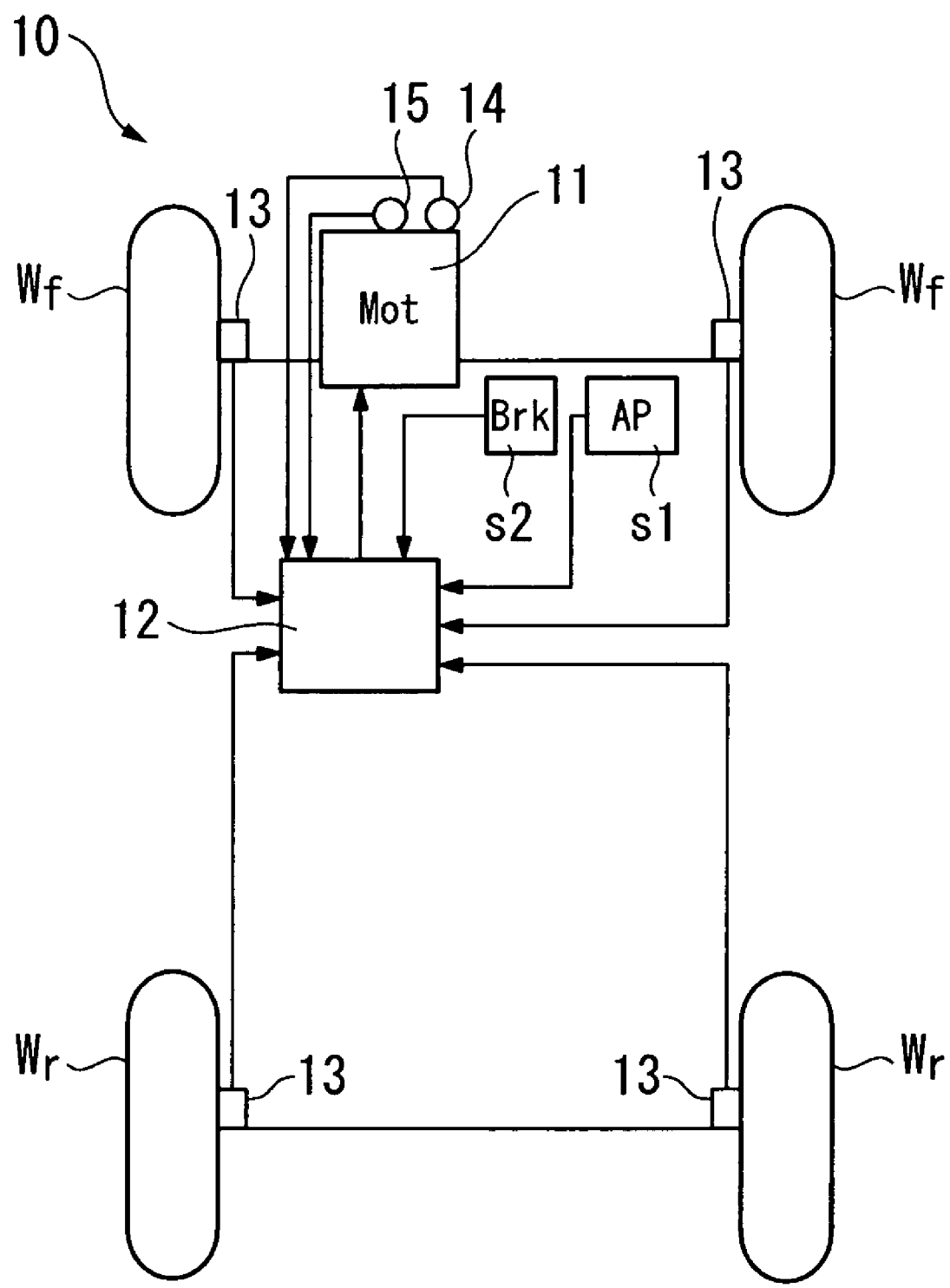
FIG. 1 is a schematic block diagram of a vehicle according to an embodiment of the present invention.

The motor control device 1 according to the present embodiment is installed in a vehicle, such as a hybrid vehicle or an electric vehicle, furnished with a motor as the propulsion source. More specifically, as shown in FIG. 1, a vehicle 10 is an electric vehicle furnished with a motor (Mot) 11 as the driving source, and the driving force of the motor 11 is transmitted to the front wheels Wf of the vehicle 10.

Moreover, when a driving force is transmitted to the motor 11 from the front wheels Wf side at the time of deceleration of the vehicle 10, the motor 11 functions as an electrical generator and generates a so called regenerative braking force, and the kinetic energy of the vehicle body is recovered as electrical energy (regenerative energy). Here for the vehicle 10 provided with a control apparatus 12, there is provided with various sensors such as: an accelerator pedal opening sensor (hereunder simply called an AP opening sensor) s1; a brake pedal switch sensor (hereunder simply called a BrkSW sensor) s2; wheel speed sensors 13 provided in the front wheels Wf and the rear wheels Wr, a rotation sensor 14, and a torque sensor 15. The control unit 12, based on detection results from these various sensors, outputs a control command to the control system of the motor 11.

Figure 2:
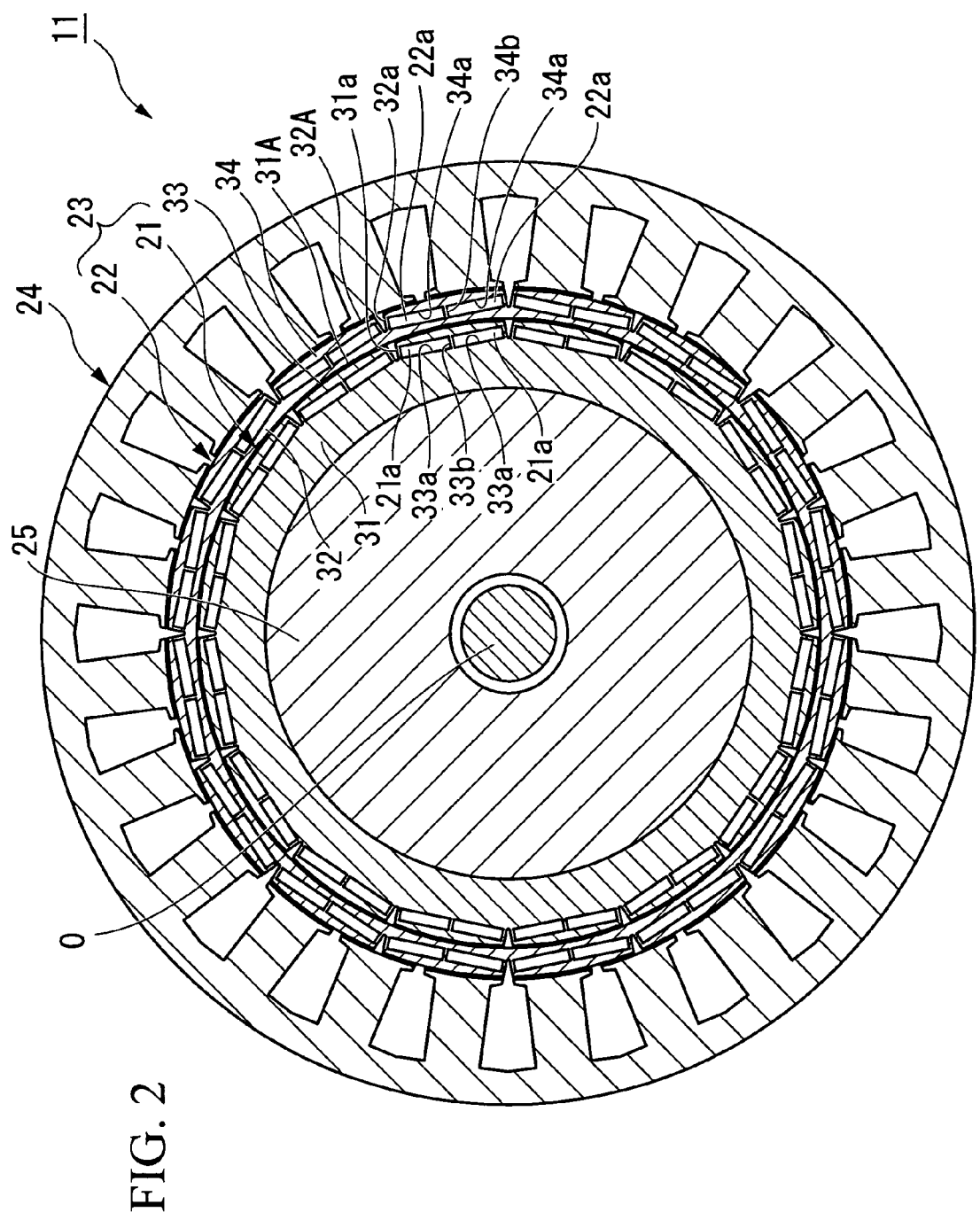
FIG. 2 is a side cross-section view of a motor according to the same embodiment.
Figure 3:
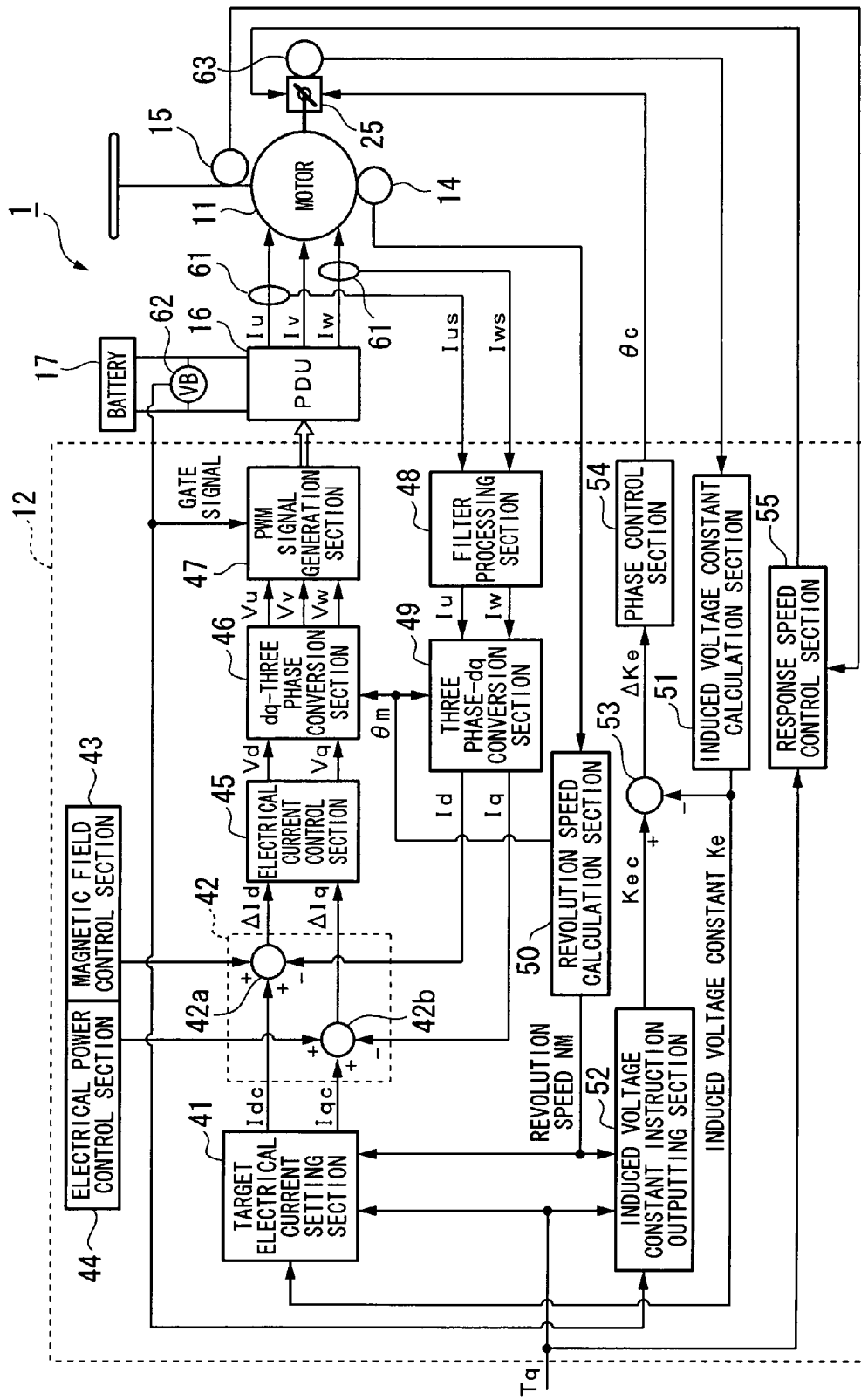
FIG. 3 is a configuration diagram of a control device of the same motor.

The motor 11 is, for example, as shown in FIG. 2, furnished with: a rotor 23 having an inner periphery side rotor 21 and an outer periphery side rotor 22 that are approximately toric, which have permanent magnets 21a and 22a that are arranged around the circumferential direction; a stator 24 which has a plurality of phases of stator windings (not shown in the drawing), that generates a rotating magnetic field that rotates the rotor 23; and a phase control device 25 that controls the relative phases between the inner periphery side rotor 21 and the outer periphery side rotor 22.

The inner periphery side rotor 21 and the outer periphery side rotor 22 are arranged such that their mutual rotation axes become the same axis as the rotation axis O of the motor 11. They are furnished with: approximately cylindrical rotor cores 31 and 32; a plurality of inner peripheral magnet mounting attachments 33 which are provided at fixed intervals in the circumferential direction on the outer peripheral section of the first rotor core 31; and a plurality of outer peripheral magnet mounting attachments 34 which are provided at fixed intervals in the circumferential direction on the interior of the second rotor core 32.

Moreover, in the intervals between inner peripheral magnet mounting attachments 33 that are adjacent in the circumferential direction, a concave groove 31a that extends parallel to the rotation axis O is formed on the outer peripheral surface 31A of the first rotor core 31.

Furthermore, in the intervals between outer peripheral magnet mounting attachments 34 that are adjacent in the circumferential direction, a concave groove 32a that extends parallel to the rotation axis O is formed on the outer peripheral surface 32A of the second rotor core 32.

The magnet mounting attachments 33 and 34, for example, are furnished with pairs of magnet mounting holes 33a and 34a that pass through parallel to the rotation axis O, and they are arranged such that the pair of magnet mounting holes 33a are adjacent in the circumferential direction via the center rib 33b, and the pair of magnet mounting holes 34a are adjacent in the circumferential direction via the center rib 34b.

Moreover, in regard to the magnet mounting holes 33a and 34a, the cross-section with respect to the direction parallel to the rotation axis O is formed in an approximately rectangular shape in which the approximately circumferential direction is the longer dimension direction and the approximately radial direction is the shorter dimension direction, and approximately rectangular shaped plate form permanent magnets 21a and 22a that extend parallel to the rotation axis O are mounted in the magnet mounting holes 33a and 34a.

The pair of inner peripheral permanent magnets 21a that are mounted in the pair of magnet mounting holes 33a are magnetized in the thickness direction (that is, in the radial direction of the rotors 21 and 22), and are set such that the mutual magnetization directions are the same direction. Moreover, with respect to the inner peripheral magnet mounting attachments 33 which are adjacent in the circumferential direction, the pairs of inner peripheral permanent magnets 21a and inner peripheral permanent magnets 21a that are mounted in the pairs of magnet mounting holes 33a and 33a, are set such that the mutual magnetization directions are different directions. That is to say, the inner peripheral magnet mounting attachment 33 to which a pair of inner peripheral permanent magnets 21a have been mounted, in which the outer periphery has been made the S-pole, is made to be adjacent in the circumferential direction to the inner peripheral magnet mounting attachment 33 to which a pair of inner peripheral permanent magnets 21a have been mounted, in which the outer periphery has been made the N-pole, via the concave groove 31a.

In the same manner, the pair of outer peripheral permanent magnets 22a that are mounted in the pair of magnet mounting holes 34a are magnetized in the thickness direction (that is, in the radial direction of the rotors 21 and 22), and are set such that the mutual magnetization directions are the same direction. Furthermore, with respect to the outer peripheral magnet mounting attachments 34 which are adjacent in the circumferential direction, the pairs of outer peripheral permanent magnets 22a and outer peripheral permanent magnets 22a that are mounted in the pairs of magnet mounting holes 34a and 34a, are set such that the mutual magnetization directions are different directions. That is to say, the outer peripheral magnet mounting attachment 34 to which a pair of outer peripheral permanent magnets 22a have been mounted, in which the outer periphery has been made the S-pole, is made to be adjacent in the circumferential direction to the outer peripheral magnet mounting attachment 34 to which a pair of outer peripheral permanent magnets 22a have been mounted, in which the outer periphery has been made the N-pole, via the concave groove 32a.

Moreover, the magnet mounting attachments 33 of the inner periphery side rotor 21 and the magnet mounting attachments 34 of the outer periphery side rotor 22, and furthermore, the concave grooves 31a of the inner periphery side rotor 21 and the concave grooves 32a of the outer periphery side rotor 22, are arranged so as to be able to mutually oppose in the radial direction of the rotors 21 and 22.

Consequently, according to the relative position of the inner periphery side rotor 21 and the outer periphery side rotor 22 about the rotation axis O, the state of the motor 11 is able to be set to an appropriate state ranging from a weak magnetic field state, in which the like-poles of the magnetic poles of the inner peripheral permanent magnet 21a of the inner periphery side rotor 21 and the outer peripheral permanent magnet 22a of the outer periphery side rotor 22 are opposingly arranged (that is, the inner peripheral permanent magnet 21a and the outer peripheral permanent magnet 22a are in a like-pole facing arrangement), to a strong magnetic field state, in which the unlike-poles of the magnetic poles of inner peripheral permanent magnet 21a of the inner periphery side rotor 21 and the outer peripheral permanent magnet 22a of the outer periphery side rotor 22 are opposingly arranged (that is, the inner peripheral permanent magnet 21a and the outer peripheral permanent magnet 22a are in an unlike-pole facing arrangement).

The control section 12 performs electrical current feedback control in dq coordinates which constitute rotating orthogonal coordinates, and, for example, calculates the d-axis electrical current instruction Idc and the q-axis electrical current instruction Iqc based on the torque instruction value Tq that is determined from an accelerator opening sensor that detects the opening of the accelerator relating for example to the accelerator operation of the driver. Moreover the control section 12 calculates the phase output voltages Vu, Vv, and Vw based on the d-axis electrical current instruction Idc and the q-axis electrical current instruction Iqc, and as well as inputting a PWM signal, which is a gate signal, to the PDU 16, according to the phase output voltages Vu, Vv, and Vw, it performs a control such that the deviation between the d-axis electrical current Id and the q-axis electrical current Iq, which are obtained by converting two phase electrical currents among the phase electrical currents Iu, Iv, and Iw, which are actually supplied from the PDU 16 to the motor 11, into electrical currents in dq coordinates, and the deviation between the d-axis electrical current instruction Idc and the q-axis electrical current instruction Iqc, become zero.

This control section 12 is configured for example by; a target electrical current setting section 41, an electrical current deviation calculation section 42, a magnetic field control section 43, an electrical power control section 44, an electrical current control section 45, a dq-three phase conversion section 46, a PWM signal generation section 47, a filter processing section 48, a three phase-dq conversion section 49, a revolution speed calculation section 50, an induced voltage constant calculation section 51, an induced voltage constant instruction outputting section 52, an induced voltage constant difference calculation section 53, a phase control section 54, and a response speed control section 55.

Furthermore, to this control section 12 are input: detection signals Ius and Iws that are output from the electrical current sensors 61 which detect the two phases of the U-phase electrical current Iu and the W-phase electrical current Iw among the three phases of electrical currents Iu, Iv, and Iw that are output from the PDU 16 to the motor 11; a detection signal that is output from a voltage sensor 62 which detects the terminal voltage (power source voltage) VB of the battery 17; a detection signal output from a rotation sensor 14 which detects the rotation angle θm of the rotors of the motor 11 (that is, the rotation angle of the magnetic poles of the rotors from a predetermined reference rotation position); a detection signal output from a torque sensor 15 which detects output torque of the motor 11; and a detection signal output from a phase sensor 63 which detects the relative phase θ between the inner periphery side rotor 21 and the outer periphery side rotor 22, which are variably controlled by the phase control device 25.

The target electrical current setting section 41 calculates for example; an electric current instruction for specifying the phase electrical currents Iu, Iv, and Iw that are supplied from the PDU 16 to the motor 11 based on the torque instruction value Tq (for example, an instruction value for generating the necessary torque in the motor 11 according to the output from the accelerator opening sensor, which detects the depression operation amount of the accelerator pedal AP by the driver) that is input from a control device (not shown in the drawing) on the exterior, the revolution speed NM of the motor 11 which is input from the revolution speed calculation section 50, and the induced voltage constant Ke which is input from the induced voltage constant calculation section 51 mentioned below, and this electrical current instruction is output to the electrical current deviation calculation section 42 as a d-axis target current instruction Idc and a q-axis target current instruction Iqc in rotating orthogonal coordinates.

In regard to the dq coordinates which constitute these rotating orthogonal coordinates, for example, the magnetic flux of the field pole resulting from the permanent magnets of the rotors is made the d-axis (magnetic field axis), and the direction that is perpendicular to this d-axis is made the q-axis (torque axis), and they are rotated with the same period as the rotation phase of the rotor 23 of the motor 11. Consequently, the d-axis target current instruction Idc and the q-axis target current instruction Iqc, which are direct current signals, are provided as an electrical current instruction corresponding to the alternating current signal that is provided from the PDU 16 to the phases of the motor 11.

The electrical current deviation calculation section 42 is configured by; a d-axis electrical current deviation calculation section 42a that calculates the deviation ΔId between the d-axis target current Idc, to which a d-axis correction electrical current input from the magnetic field control section 43 has been added, and the d-axis electrical current Id, and a q-axis electrical current deviation calculation section 42b that calculates the deviation ΔIq between the q-axis target current Iqc, to which a q-axis correction electrical current input from the electrical power control section 44 has been added, and the q-axis electrical current Iq.

The magnetic field control section 43, for example, equivalently weakens the magnetic field quantities of the rotor 23 in order to control the increase in counter-electromotive force that accompanies the increase in the revolution speed NM of the motor 11, and outputs the target value with respect to the weak field current of the weak magnetic field control which controls the electrical current phases, to the d-axis electrical current deviation calculation section 42a as the d-axis correction electrical current.

Furthermore, the electrical power control section 44, for example, outputs the q-axis correction electrical current for correcting the q-axis target current Iqc according to an appropriate electrical power control corresponding to the remaining charge of the battery 17, or the like, to the q-axis electrical current deviation calculation section 42b.

The electrical current control section 45, for example, by means of a PI (proportional integral) corresponding to the revolution speed NM of the motor 11, performs controlled amplification of the deviation ΔId and calculates the d-axis voltage instruction value Vd, and performs controlled amplification of the deviation ΔIq and calculates the q-axis voltage instruction value Vq.

The dq-three phase conversion section 46 uses the rotation angle θm of the rotor 23 that is input from the revolution speed calculation section 50, and converts the d-axis voltage instruction value Vd and the q-axis voltage instruction value Vq, which are in dq coordinates, into a U-phase output voltage Vu, a V-phase output voltage Vv, and a W-phase output voltage Vw, which are voltage instruction values in three-phase alternating current coordinates, which are static coordinates.

The PWM signal generation section 47, for example, by means of; the sine wave form phase output voltages Vu, Vv, and Vw, a carrier signal including a triangular wave, and pulse width modulation based on the switching frequency, generates a gate signal (that is, a PWM signal) which is a switching instruction including the pulses that drive the switching elements of the PWM inverter of the PDU 16 ON and OFF.

The filter processing section 48 performs filter processing, such as removal of high frequency components, with respect to the detection signals Ius and Iws of the phase electrical currents detected by the electrical current sensors 61, and extracts the phase electrical currents Iu and Iw as physical quantities.

The three phase-dq conversion section 49 calculates the d-axis electrical current Id and the q-axis electrical current Iq in dq coordinates, that is to say, the rotation coordinates resulting from the rotation phases of the motor 11, by means of the phase electrical currents Iu and Iw extracted from the filter processing section 48 and the rotation angle θm of the rotor 23 that is input from the revolution speed calculation section 50.

The revolution speed calculation section 50, as well as extracting the rotation angle θm of the rotor 23 of the motor 11 from the detection signal output from the rotation sensor 14, calculates the revolution speed NM of the motor 11 based on this rotation angle θm.

The induced voltage constant calculation section 51 calculates the induced voltage constant Ke corresponding to the relative phase θ between the inner periphery side rotor 21 and the outer periphery side rotor 22 based on the detection signal of the phase θ output from the phase sensor 63.

The induced voltage constant instruction output section 52, for example, outputs the instruction value (induced voltage constant instruction value) Kec with respect to the induced voltage constant Ke of the motor 11, based on the torque instruction value Tq and the revolution speed NM of the motor 11.

The induced voltage constant difference calculation section 53 outputs the induced voltage constant difference ΔKe which is obtained by subtracting the induced voltage constant Ke that is output from the induced voltage constant calculation section 51, from the induced voltage constant instruction value Kec that is output from the induced voltage constant instruction output section 52.

The phase control section 54, for example, according to the induced voltage constant difference ΔKe that is output from the induced voltage constant difference calculation section 53, outputs a control instruction (for example a phase instruction θc or the like) for controlling the phase θ by making this induced voltage constant difference ΔKe zero.

The response speed control section 55, in a control operation that sets the relative phase between the inner periphery side rotor 21 and the outer periphery side rotor 22 by the phase control device 25 to a value corresponding to the phase instruction θc, in accordance with the deviation between the torque instruction tq for the motor 11 and the actual torque (that is, the detection value by the torque sensor 15), or in accordance with the deviation of the integral value pairs for the torque instruction tq and the actual torque in the predetermined time interval, controls the response speed (that is, the phase changing speed) of the actuator (omitted from the drawings) that is provided for example with the phase control device 25, and sets the relative phase so that the phase changing speed changes in a downward trend with an increase in the deviations.

The motor control device 1 of the present invention is furnished with the aforementioned configuration. Next, the operation of this motor control device 1, in particular the process of response switching control, is described with reference to the appended drawings.

Figure 4:
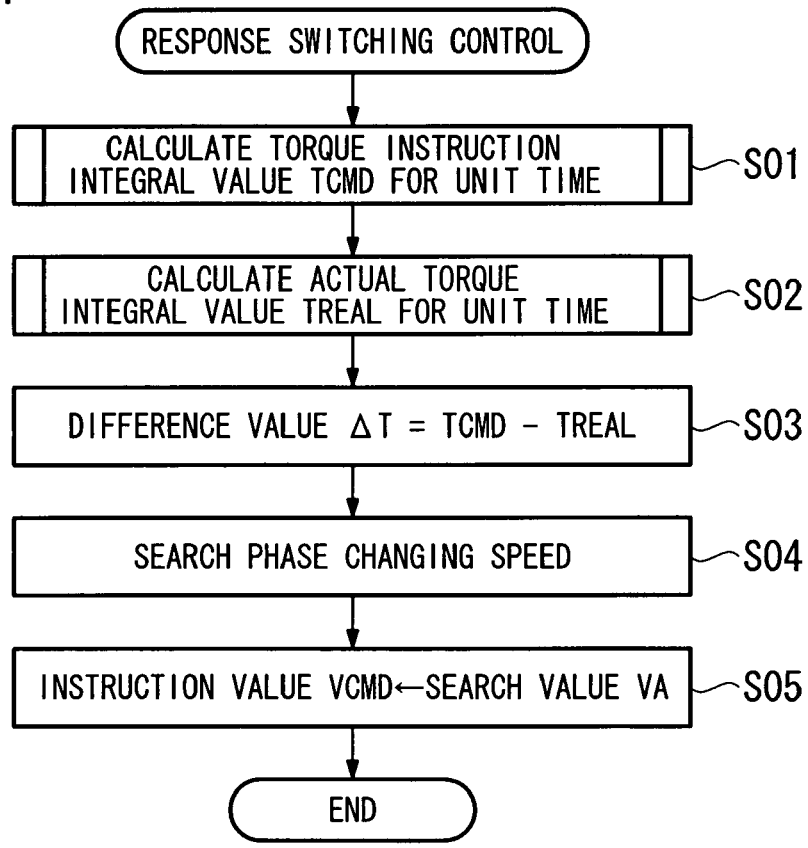
FIG. 4 is a flow chart illustrating an operation of the control device of the same motor.

Firstly, for example in step S01 shown in FIG. 4, the torque instruction tq for the motor 11 is integrated in a predetermined time interval, to calculate a torque instruction integral value TCMD.

Then, in step S02, the actual torque of the motor 11, (that is, the detection value of the torque sensor 15) is integrated in the predetermined time interval, to calculate an actual torque integral value TREAL.

Then, in step S03, the actual torque integral value TREAL is subtracted from the torque instruction integral value TCMD, and the obtained value is set as a difference value ΔT.

Then, in step S04, a map or the like showing a predetermined relationship for example between a previously set difference value ΔT and a phase changing speed VA is referred to, and a phase changing speed VA corresponding to the difference value ΔT is acquired by map searching or the like.

Figure 5:
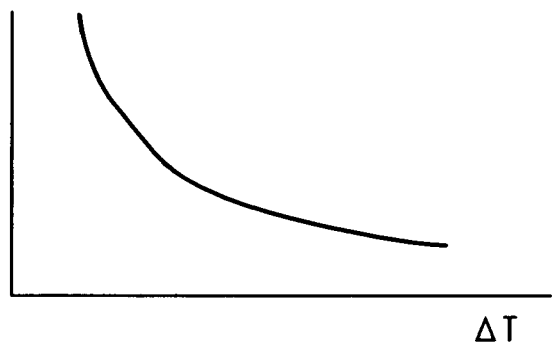
FIG. 5 is a graph showing an example of a relationship between a difference value of the torque of the same motor, and phase changing speed.

A map or the like which shows a predetermined relationship between the previously set difference value ΔT and the phase changing speed VA, is set for example as shown in FIG. 5, so that the phase changing speed VA changes in a downward trend with an increase in the difference value ΔT.

Then, in step S05, the acquired phase changing speed (for example the search value) VA is set as an instruction value VCMD, and the processing for one series ends.

Figure 6:
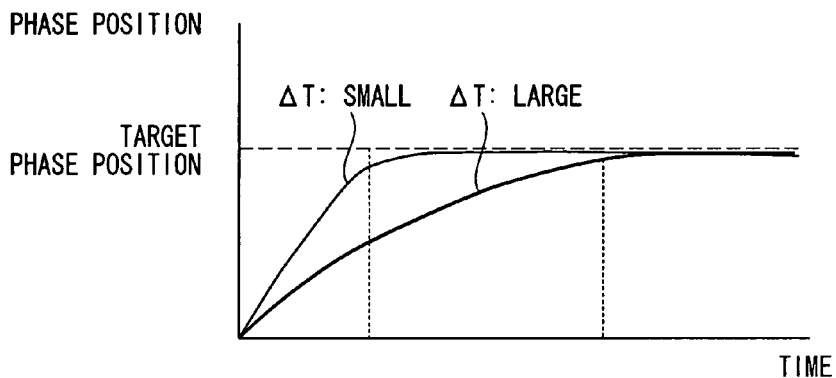
FIG. 6 is a graph illustrating an example of a time change of a phase position of the same motor.

As described above, according to the motor control device 1 of the present embodiment, since the phase changing speed VA changes in a downward trend with an increase in the difference value ΔT, then for example as shown in FIG. 6, with an increase in the difference value ΔT, the necessary time up until the relative phase between the inner periphery side rotor 21 and the outer periphery side rotor 22 of the motor 11 reaches an appropriate target phase position changes in an increasing trend. As a result, even in the case for example where a fault occurs in the current control (that is, the current feedback control so that the deviation between the current instruction value for the excitation current of the motor 11 and the current detection value becomes zero) with respect to the excitation current of the motor 11, attributable to a phase change by the phase control device 25, the occurrence of this fault can be suppressed, and appropriate current control can be performed.

Figure 8:
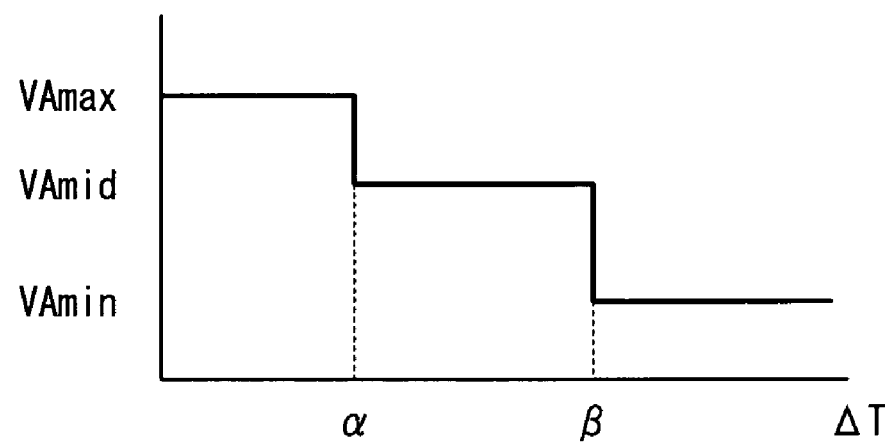
FIG. 8 is a graph illustrating an example of a relationship between a difference value of torque of the motor according to the same modified embodiment, and phase changing speed.

In the present embodiment as described above, in a map or the like showing a predetermined relationship between the previously set difference value ΔT and the phase changing speed VA, for example as shown in FIG. 5, the phase changing speed VA smoothly changes in accordance with the change of the difference value ΔT. However the relationship is not limited to this, and for example with a map or the like shown in FIG. 8, that shows a predetermined relationship between the difference value ΔT and the phase changing speed VA according to a modified example of the abovementioned embodiment, the setting may be such that for example the phase changing speed VA changes stepwise depending on the difference value ΔT.

Figure 7:
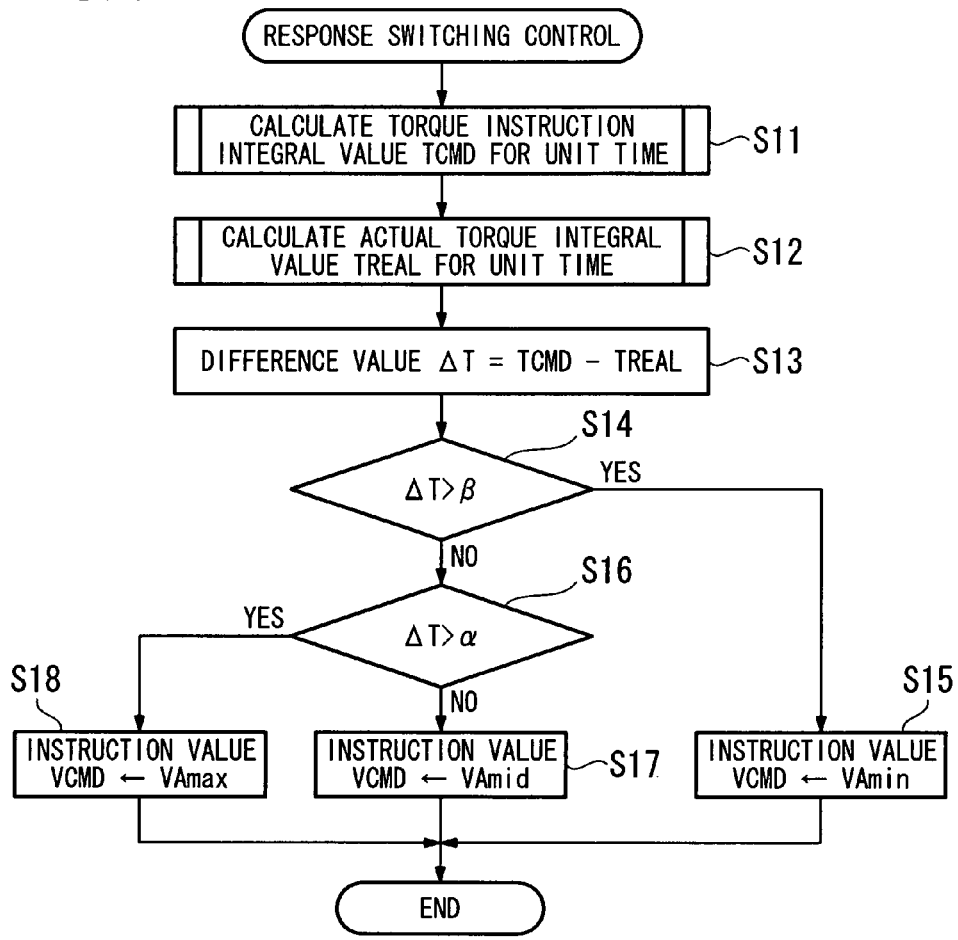
FIG. 7 is a flow chart illustrating an operation of a control device of a motor according to a modified example of the same embodiment.

In this modified example, for example in step S11 shown in FIG. 7, the torque instruction value Tq for the motor 11 is integrated in a predetermined time interval to compute the torque instruction integral value TCMD.

Then, in step S12, the actual torque of the motor 11 (that is, the detection value by the torque sensor 15) is integrated in the predetermined time interval to calculate the actual torque integral value TREAL.

Then, in step S13, the actual torque integral value TREAL is subtracted from the torque instruction integral value TCMD, and the obtained value is set as the difference value ΔT.

Then, in step S14, it is determined whether the difference value ΔT is greater than a predetermined value β or not.

When the determination is "NO", the process proceeds to step S16 mentioned later.

On the other hand, when the determination is "YES", the process proceeds to step S15.

Then, in step S15, a predetermined phase changing speed minimum value VAmin is set as the instruction value VCMD, and the processing for one series ends.

Furthermore, in step S16, it is determined whether the difference value ΔT is less than a predetermined value a that is smaller than the predetermined value β, or not.

When the determination is "NO", the process proceeds to step S17, and in step S17 a predetermined phase changing speed middle value VAmid (>VAmin) is set as the instruction value VCMD, and the processing for one series ends.

On the other hand, when the determination is "YES", the process proceeds to step S18, and in step S18 a predetermined phase changing speed maximum value VAmax (>VAmid) is set as the instruction value VCMD, and the processing for one series ends.

In the vehicle 10 according to the abovementioned embodiment, it is set such that with respect to the deviation between the torque instruction value Tq for the motor 11 and the actual torque, or the deviation of the integral value pairs for the torque instruction value Tq and the actual torque in a predetermined time interval, the phase changing speed changes in a downward trend with an increase in the deviations. However, the setting is not limited to this and may be such that for example in the case where the deviation of the integral value pairs for the torque instruction Tq and the actual torque in a predetermined time interval exceeds a predetermined threshold value, the phase changing speed changes in a downward trend with an increase in this deviation.

In the vehicle 10 according to the abovementioned embodiment, the motor 11 may be equipped for example as a propulsion drive motor of a hybrid vehicle, or for example may be equipped as a starter motor for starting an internal combustion engine of a vehicle with the internal combustion engine as a drive source, or as an alternator.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A motor control device comprising:
   a motor that has a plurality of rotors which respectively have a magnetic piece, which drives or supplementarily drives a vehicle;
   a phase changing mechanism that changes relative phases of said plurality of rotors, and sets these to a predetermined induced voltage constant; and
   a speed control device that controls a phase changing speed of said phase changing mechanisms,
   wherein said speed control device controls said phase changing speed in accordance with a deviation between a torque command and an actual torque for said motor, and
   wherein said speed control device controls such that said phase changing speed changes in a downward trend following an increase in said deviation.

2. The motor control device according to claim 1, wherein said speed control device integrates said torque command and said actual torque in a predetermined time interval, and in a case where a deviation of integral value pairs exceeds a predetermined threshold value, changes said phase changing speed in a downward trend.

3. The motor control device according to claim 2, wherein said motor drives the vehicle, or assists traveling of the vehicle which is driven by an internal combustion engine.

4. The motor control device according to claim 1, wherein said motor drives the vehicle, or assists traveling of the vehicle which is driven by an internal combustion engine.

5. The motor control device according to claim 1, wherein said motor drives the vehicle, or assists traveling of the vehicle which is driven by an internal combustion engine.

6. A motor control device comprising:
   a motor that has a plurality of rotors which respectively have a magnetic piece, which drives or supplementarily drives a vehicle;
   a phase changing mechanism that changes relative phases of said plurality of rotors, and sets these to a predetermined induced voltage constant; and
   a speed control device that controls a phase changing speed of said phase changing mechanism,
   wherein said speed control device controls said phase changing speed in accordance with a deviation between a torque command and an actual torque for said motor, and
   wherein said speed control device integrates said torque command and said actual torque in a predetermined time interval, and in a case where a deviation of integral value pairs exceeds a predetermined threshold value, changes said phase changing speed in a downward trend.

7. The motor control device according to claim 6, wherein said motor drives the vehicle, or assists traveling of the vehicle which is driven by an internal combustion engine.

* * * * *